US008484959B2

(12) United States Patent
Tsujimoto et al.

(10) Patent No.: US 8,484,959 B2
(45) Date of Patent: Jul. 16, 2013

(54) CATALYST APPARATUS AND EXHAUST GAS PURIFICATION SYSTEM FOR INTERNAL COMBUSTION ENGINE

(75) Inventors: Kenichi Tsujimoto, Susono (JP); Shinya Hirota, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 443 days.

(21) Appl. No.: 12/990,616

(22) PCT Filed: May 2, 2008

(86) PCT No.: PCT/JP2008/058686
§ 371 (c)(1),
(2), (4) Date: Nov. 1, 2010

(87) PCT Pub. No.: WO2009/133632
PCT Pub. Date: Nov. 5, 2009

(65) Prior Publication Data
US 2011/0041487 A1    Feb. 24, 2011

(51) Int. Cl.
*F01N 3/36* (2006.01)
(52) U.S. Cl.
USPC ............ 60/303; 60/286; 60/287; 60/295; 60/299; 60/300; 60/320
(58) Field of Classification Search
USPC ............ 60/282, 286, 287, 295, 297, 299, 60/300, 301, 303, 311, 320
See application file for complete search history.

(56) References Cited

U.S. PATENT DOCUMENTS

| 5,611,198 A | 3/1997 | Lane et al. |
| 5,829,250 A | 11/1998 | Lane et al. |

(Continued)

FOREIGN PATENT DOCUMENTS

| JP | 04-140413 A | 5/1992 |
| JP | 06-106068 A | 4/1994 |

(Continued)

OTHER PUBLICATIONS

Office Action issued by the Japanese Patent Office for the corresponding Japanese Patent Application No. 2006-355148, English translation.

*Primary Examiner* — Thomas Denion
*Assistant Examiner* — Jorge Leon, Jr.
(74) *Attorney, Agent, or Firm* — Sughrue Mion, PLLC

(57) ABSTRACT

An object is to provide a technology with which the temperature of exhaust gas can be raised with improved efficiency in cases where a catalyst apparatus including a catalyst having an oxidizing ability is provided in an exhaust passage of an internal combustion engine. According to the present invention, a catalyst apparatus 6 that is provided in the exhaust passage 1 of the internal combustion engine and to which reducing agent is supplied from upstream when the temperature of the exhaust gas is to be raised is equipped with at least first and second catalysts 4, 5 having an oxidizing ability. The first catalyst 4 is configured in such a way that the exhaust gas flows through a gap between its outer circumferential surface and the inner circumferential surface of the exhaust passage. The second catalyst 5 is disposed downstream of the first catalyst 4 with a space 10 having a specific width Ws between it and the first catalyst 4.

13 Claims, 10 Drawing Sheets

U.S. PATENT DOCUMENTS

| | | | |
|---|---|---|---|
| 6,192,675 B1* | 2/2001 | Hirota et al. | 60/286 |
| 2003/0095896 A1 | 5/2003 | Shirahata et al. | |
| 2005/0000208 A1 | 1/2005 | Liu | |
| 2007/0051097 A1 | 3/2007 | Klein | |
| 2007/0065350 A1* | 3/2007 | Maus et al. | 422/180 |
| 2007/0068148 A1* | 3/2007 | Kurata et al. | 60/297 |
| 2007/0137187 A1* | 6/2007 | Kumar | 60/299 |
| 2007/0227129 A1* | 10/2007 | Sugihara et al. | 60/299 |
| 2008/0053070 A1* | 3/2008 | Hatton | 60/286 |
| 2008/0053075 A1 | 3/2008 | Ueda et al. | |
| 2008/0072576 A1* | 3/2008 | Honda et al. | 60/286 |
| 2008/0072580 A1* | 3/2008 | Nagaoka et al. | 60/301 |
| 2008/0120966 A1 | 5/2008 | Sugiyama et al. | |
| 2009/0217647 A1* | 9/2009 | Daneau | 60/286 |
| 2011/0138786 A1* | 6/2011 | Koenigsegg | 60/287 |

FOREIGN PATENT DOCUMENTS

| | | |
|---|---|---|
| JP | 07-290617 A | 11/1995 |
| JP | 9-504349 A | 4/1997 |
| JP | 11-200844 A | 7/1999 |
| JP | 2002-070543 A | 3/2002 |
| JP | 2003-120264 A | 4/2003 |
| JP | 2003-155926 A | 5/2003 |
| JP | 2004-162611 A | 6/2004 |
| JP | 2005-023932 A | 1/2005 |
| JP | 2005-127257 A | 5/2005 |
| JP | 2006-077691 A | 3/2006 |
| JP | 2006-161629 A | 6/2006 |
| JP | 2006-214388 A | 8/2006 |
| JP | 2006-274838 A | 10/2006 |
| JP | 2007-071202 A | 3/2007 |

* cited by examiner (a)
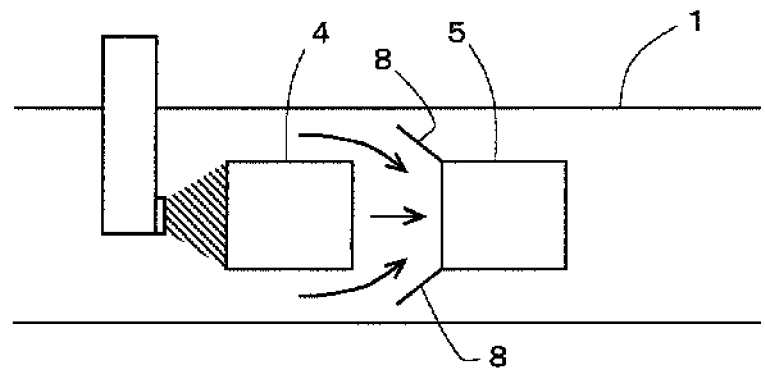
(b)
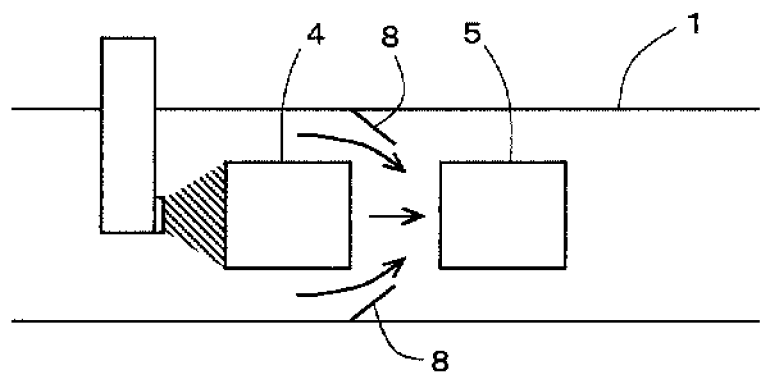
(c)
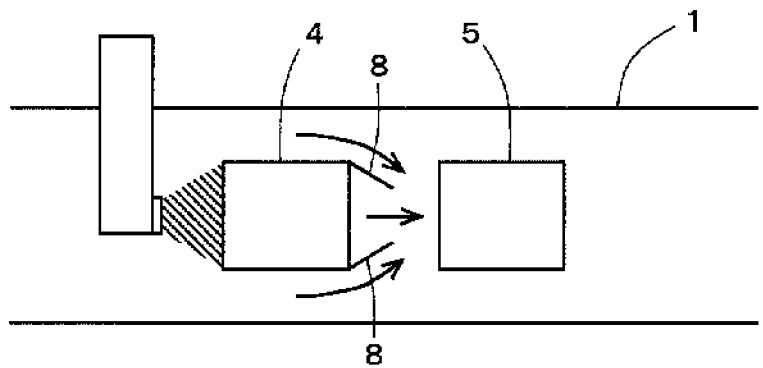
Fig. 3

US 8,484,959 B2

CATALYST APPARATUS AND EXHAUST GAS PURIFICATION SYSTEM FOR INTERNAL COMBUSTION ENGINE

This is a National Stage Entry of International Application No. PCT/JP2008/058686 filed May 2, 2008, the content of which is incorporated herein by reference in its entirety.

TECHNICAL FIELD

The present invention relates to a catalyst apparatus and exhaust gas purification system for an internal combustion engine.

BACKGROUND ART

A catalyst apparatus that has a catalyst having an oxidizing ability is provided in an exhaust passage of an internal combustion engine. As reducing agent is supplied to the catalyst apparatus, the temperature of the exhaust gas can be raised by the heat of oxidation generated by oxidation of the reducing agent.

For example, in the case where the catalyst apparatus is provided in the exhaust passage upstream of an exhaust gas purification apparatus composed of an NOx storage reduction catalyst (which will be hereinafter referred to as the "NOx catalyst") and a particulate filter (which will be hereinafter referred to as the "filter") etc, the temperature of the exhaust gas purification apparatus can be raised by supplying reducing agent to the catalyst apparatus to thereby raise the temperature of the exhaust gas as described above, when, for example, the capability of the exhaust gas purification apparatus is to be recovered.

Japanese Patent Application Laid-Open No. 2005-127257 describes a technology in which a reforming catalyst for reforming supplied fuel is provided in an exhaust passage upstream of an NOx catalyst. Japanese Patent Application Laid-Open No. 2005-127257 also discloses a technology in which the reforming catalyst is disposed at a central position of the exhaust passage so that a roundabout exhaust gas flow channel is formed around the outer circumference of the reforming catalyst.

Japanese Patent Application Laid-Open No. 2004-162611 discloses a technology in which an oxidation catalyst provided in the exhaust passage upstream of a filter is composed of a plurality of catalysts having different numbers of cells per unit area that are arranged in multiple stages from upstream to downstream.

Furthermore, Japanese Patent Application Laid-Open No. 6-106068, Japanese Patent Application Laid-Open No. 2003-120264, Japanese Patent Application Laid-Open No. 2006-161629, Publication of Japanese Translation of PCT International Application No. 9-504349 also disclose technologies pertaining to the construction or arrangement of oxidation catalyst(s) provided in the exhaust passage of an internal combustion engine.

DISCLOSURE OF THE INVENTION

An object of the present invention is to provide a technology that enables the temperature of the exhaust gas to be raised efficiently in cases where a catalyst apparatus that has a catalyst having an oxidizing ability is provided in an exhaust passage of an internal combustion engine.

According to the present invention, a catalyst apparatus provided in an exhaust passage of an internal combustion engine, to which reducing agent is supplied from upstream when the temperature of the exhaust gas is to be raised, has a first catalyst and a second catalyst, at least. The first catalyst is configured in such a way that the exhaust gas flows through the gap between its outer circumferential surface and the inner circumferential surface of the exhaust passage. The second catalyst is disposed downstream of the first catalyst with a certain gap between it and the first catalyst.

More specifically, a catalyst apparatus according to a first invention is a catalyst apparatus for an internal combustion engine that is provided in an exhaust passage of the internal combustion engine and to which reducing agent is supplied from upstream when the temperature of exhaust gas is to be raised, characterized by comprising:

a first catalyst having an oxidizing ability that is configured in such a way that the exhaust gas flows through a gap between its outer circumferential surface and an inner circumferential surface of said exhaust passage; and a second catalyst having an oxidizing ability that is disposed downstream of the first catalyst with a space having a specific width between it and the first catalyst and configured in such a way that the exhaust gas flows through a gap between its outer circumferential surface and the inner circumferential surface of said exhaust passage.

According to the present invention, the first and the second catalysts are configured in such a way that the exhaust gas flows through the gaps between their outer circumferential surfaces and the inner circumferential surface of the exhaust passage. In this case, the cross sectional area of each catalyst in the direction perpendicular to the direction of flow of the exhaust gas is smaller than that in the case where the catalyst is configured in such a way that the entire exhaust gas flowing in the exhaust passage flows through the interior of the catalyst. This makes the resistance against the exhaust gas flow as the exhaust gas passes through each catalyst higher, thereby making the flow rate of the exhaust gas flowing in each catalyst lower. As a result, the time taken for the reducing agent supplied to the catalyst to pass through the interior of the catalyst becomes longer. Therefore, the reforming reaction and the oxidation reaction of the reducing agent in the catalyst are more prone to be promoted. Consequently, the temperature rise of the exhaust gas can be promoted.

However, if the flow rate of the exhaust gas flowing in the interior of the catalyst becomes unduly low due to a decrease in the cross sectional area of the catalyst in the direction perpendicular to the direction of flow of the exhaust gas, the supply of oxygen to the downstream portion of the catalyst will become insufficient, whereby the oxidation reaction of the reducing agent in the downstream portion of the catalyst may be difficult to promote in some cases. Consequently, it may become difficult to raise the temperature of the exhaust gas efficiently, and/or the quantity of reducing agent discharged downstream of the catalyst without being oxidized may increase.

According to the present invention, the catalyst is divided into the first catalyst and the second catalyst. This allows the length of the first catalyst along the direction of flow of the exhaust gas to be made relatively short. Therefore, the supply of oxygen to the downstream portion of the first catalyst can be prevented from becoming insufficient.

Furthermore, according to the present invention, the second catalyst is disposed downstream of the first catalyst with a space having a specific width between it and the first catalyst. According to the present invention, since the flow rate of the exhaust gas flowing in the first catalyst is low, the flow rate of the exhaust gas flowing in the gap between the outer circumferential surface of the first catalyst and the inner circumferential surface of the exhaust passage is higher than the flow rate of the exhaust gas flowing in the space between the first catalyst and the second catalyst. Thus, there are created exhaust gas flows created from the gap between the outer circumferential surface of the first catalyst and the inner circumferential surface of the exhaust passage to the space between the first catalyst and the second catalyst. Thus, the exhaust gas having passed through the gap between the outer circumferential surface of the first catalyst and the inner circumferential surface of the exhaust passage flows into the second catalyst, whereby oxygen is supplied to the second catalyst. Therefore, the supply of oxygen to the second catalyst disposed downstream of the first catalyst can be prevented from becoming insufficient.

The second catalyst is supplied with the heat generated by the oxidation of reducing agent in the first catalyst and the reducing agent reformed in the first catalyst. In other words, according to the present invention, the reformed reducing agent and oxygen will be supplied to the second catalyst having enhanced activity. Therefore, the oxidation of the reducing agent in the second catalyst is promoted more effectively.

As per the above, according to the present invention, the oxidation of the reducing agent in the catalyst apparatus can be promoted more effectively. Consequently, the temperature of the exhaust gas can be raised more efficiently.

In the present invention, the specific width is such a width that allows at least a portion of the exhaust gas having passed through the gap between the outer circumferential surface of the first catalyst and the inner circumferential surface of the exhaust passage to flow onto the front end of the second catalyst and causes the heat generated by the oxidation of reducing agent in the first catalyst and the reducing agent reformed in and discharged from the first catalyst to reach the second catalyst without being excessively diffused.

In the present invention, the cross sectional areas of the first and second catalysts in the direction perpendicular to the axial direction (the cross sectional area in this direction will be simply referred to as the "cross sectional area", hereinafter) may be smaller than the cross sectional area of the exhaust passage.

This allows the exhaust gas to flow through the gaps between the outer circumferential surfaces of the first and the second catalysts and the inner circumferential surface of the exhaust passage.

In the present invention, the cross sectional area of the second catalyst may be larger than the cross sectional area of the first catalyst.

If this is the case, the exhaust gas having passed through the gap between the outer circumferential surface of the first catalyst and the inner circumferential surface of the exhaust passage is prone to flow into the second catalyst. Consequently, oxygen is prone to be supplied to the second catalyst.

In addition, the reducing agent contained in the exhaust gas flowing through the gap between the outer circumferential surface of the first catalyst and the inner circumferential surface of the exhaust passage and the reducing agent discharged from the first catalyst without being oxidized are prone to flow into the second catalyst. Therefore, it is possible to prevent the reducing agent from flowing downstream past the catalyst apparatus without being oxidized.

Furthermore, according to the present invention, when the reducing agent is supplied to the catalyst apparatus from upstream, the heat generated in the first catalyst and the reducing agent reformed in the first catalyst are supplied to the second catalyst, as described above. Consequently, the temperature of the second catalyst tends to become higher than the temperature of the first catalyst. The higher the temperature of the catalyst is, the higher the resistance against the exhaust gas flow in the catalyst is. Therefore, if the cross sectional area of the first catalyst and the cross sectional area of the second catalyst are the same, the resistance against the exhaust gas flow in the second catalyst may become higher than the resistance against the exhaust gas flow in the first catalyst at the time when the temperatures of the first and the second catalysts rise due to the supply of reducing agent to the catalyst apparatus.

By making the cross sectional area of the second catalyst larger than the cross sectional area of the first catalyst, the resistance against the exhaust gas flow in the second catalyst can be prevented from increasing excessively at the time when the temperatures of the first and the second catalysts rise due to the supply of reducing agent to the catalyst apparatus. Consequently, oxygen can be prevented from becoming difficult to be supplied to the downstream portion of the second catalyst. Therefore, the oxidation of the reducing agent in the second catalyst can be promoted more effectively.

In the present invention, the respective cross sectional areas of the first and the second catalysts may gradually increase from upstream to downstream.

As the reducing agent is supplied to each catalyst, the heat generated by the oxidation of the reducing agent in the upstream portion of the catalyst is transferred to the downstream portion of the catalyst, and the reducing agent reformed in the upstream portion is supplied to the downstream portion. Consequently, the temperature of each catalyst tends to increase toward the downstream side thereof. Therefore, if the cross sectional area of each catalyst is constant along the axial direction, the resistance against the exhaust gas flow in the downstream portion may become higher than the resistance against the exhaust gas flow in the upstream portion in each catalyst when the reducing agent is supplied to the catalyst.

By increasing the cross sectional area of each catalyst gradually from upstream to downstream as described above, the resistance against the exhaust gas flow in the downstream portion of the catalyst can be prevented from increasing excessively at the time when the temperature of the catalyst rises due to the supply of reducing agent to the catalyst. Consequently, oxygen can be prevented from becoming difficult to be supplied to the downstream portion of each catalyst. Therefore, the oxidation of the reducing agent in each catalyst can be promoted more effectively.

In the present invention, the cross sectional area of each cell in the second catalyst may be larger than the cross sectional area of each cell in the first catalyst.

By this feature also, the resistance against the exhaust gas flow in the second catalyst can be prevented from increasing excessively at the time when the temperatures of the first and the second catalysts rise due to the supply of reducing agent to the catalyst apparatus as with the case where the cross sectional area of the second catalyst is larger than the cross sectional area of the first catalyst. Consequently, oxygen can be prevented from becoming difficult to be supplied to the downstream portion of the second catalyst. Therefore, the oxidation of the reducing agent in the second catalyst can be promoted more effectively.

In the present invention, the cross sectional area of the first catalyst may gradually decrease from upstream to downstream.

If this is the case, the reducing agent discharged from the first catalyst without being oxidized is prone to flow into the second catalyst. Therefore, it is possible to prevent the reducing agent from flowing downstream past the catalyst apparatus without being oxidized in the first catalyst or the second catalyst.

In addition, with the above-described feature, the exhaust gas having passed through the gap between the outer circumferential surface of the first catalyst and the inner circumferential surface of the exhaust passage is prone to flow into the second catalyst. Consequently, oxygen is prone to be supplied to the second catalyst.

An exhaust gas purification system for an internal combustion engine according to a second invention comprises:

an exhaust gas purification apparatus provided in an exhaust passage of the internal combustion engine;

a catalyst apparatus provided in the exhaust passage upstream of the exhaust gas purification apparatus; and a reducing agent supply apparatus that supplies reducing agent to the catalyst apparatus from the upstream side of the catalyst apparatus, wherein when the temperature of the exhaust gas purification apparatus is to be raised, the temperature of exhaust gas is raised by supplying reducing agent from the reducing agent supply apparatus to the catalyst apparatus, characterized in that the catalyst apparatus comprises at least first and second catalysts having an oxidizing ability, the first catalyst is configured in such a way that the exhaust gas flows through a gap between its outer circumferential surface and an inner circumferential surface of the exhaust passage, and the second catalyst is disposed downstream of the first catalyst with a space having a specific width between it and the first catalyst.

In this invention, the temperature of the exhaust gas is raised by the heat generated by the oxidation of reducing agent in the catalyst apparatus, and the temperature of the exhaust gas purification apparatus is raised by the heat of the exhaust gas.

According to this invention, as with the first invention, the oxidation of reducing agent in the catalyst apparatus can be promoted more effectively. Consequently, the temperature of the exhaust gas can be raised more efficiently. Therefore, the temperature of the exhaust gas purification apparatus can be raised more efficiently.

In this invention also, as with the first invention, the specific width is such a width that allows at least a portion of the exhaust gas having passed through the gap between the outer circumferential surface of the first catalyst and the inner circumferential surface of the exhaust passage to flow onto the front end of the second catalyst and causes the heat generated by the oxidation of reducing agent in the first catalyst and the reducing agent reformed in and discharged from the first catalyst to reach the second catalyst without being excessively diffused.

In this invention also, as with the first invention, the cross sectional area of the first catalyst may be smaller than the cross sectional area of the exhaust passage.

This allows the exhaust gas to flow through the gap between the outer circumferential surface of the first catalyst and the inner circumferential surface of the exhaust passage.

In this invention also, as with the first invention, the cross sectional area of the second catalyst may be smaller than the cross sectional area of the exhaust passage.

This makes not only the cross sectional area of the first catalyst but also the cross sectional area of the second catalyst in the direction perpendicular to the direction of flow of the exhaust passage smaller. As a result, the reforming reaction and the oxidation reaction of the reducing agent in the second catalyst are more prone to be promoted. In addition, this allows the exhaust gas to flow through the gap between the outer circumferential surface of the second catalyst and the inner circumferential surface of the exhaust passage. Then, the heat generated in the second catalyst is carried to the exhaust gas purification apparatus by the exhaust gas flowing through the gap between the outer circumferential surface of the second catalyst and the inner circumferential surface of the exhaust passage. Therefore, the temperature rise of the exhaust gas purification apparatus can be promoted more effectively.

In this invention also, as with the first invention, the cross sectional area of the second catalyst may be larger than the cross sectional area of the first catalyst.

If this is the case, oxygen is prone to be supplied to the second catalyst. In addition, it is possible to prevent the reducing agent from flowing downstream past the catalyst apparatus without being oxidized. Furthermore, the resistance against the exhaust gas flow in the second catalyst can be prevented from increasing excessively at the time when the temperatures of the first and the second catalysts rise due to the supply of reducing agent to the catalyst apparatus.

In this invention also, as with the first invention, the respective cross sectional areas of the first and second catalysts may gradually increase from upstream to downstream.

If this is the case, the resistance against the exhaust gas flow in the downstream portion of each catalyst can be prevented from increasing excessively at the time when the temperature of the catalyst rises due to the supply of reducing agent to the catalyst.

In this invention also, as with the first invention, the cross sectional area of each cell in the second catalyst may be larger than the cross sectional area of each cell in the first catalyst.

By this feature also, the resistance against the exhaust gas flow in the second catalyst can be prevented from increasing excessively at the time when the temperatures of the first and the second catalysts rise due to the supply of reducing agent to the catalyst apparatus.

In this invention also, as with the first invention, the cross sectional area of the first catalyst may gradually decrease from upstream to downstream.

With this configuration, it is possible to prevent the reducing agent from flowing downstream past the catalyst apparatus without being oxidized. In addition, oxygen is prone to be supplied to the second catalyst.

In this invention, the reducing agent supply apparatus and the catalyst apparatus may be disposed close to each other in the exhaust passage in such a way that a reducing agent supply port of the reducing agent supply apparatus and an upstream end face of the first catalyst are opposed to each other.

With this configuration, the reducing agent supplied by the reducing agent supply apparatus can be prevented from being excessively diffused before reaching the first catalyst. Therefore, the temperature of the exhaust gas can be raised with a smaller quantity of reducing agent. In addition, it is possible to prevent the reducing agent injected through the reducing agent supply apparatus from flowing downstream past the catalyst apparatus without being oxidized in the catalyst apparatus.

In the above-described configuration, the reducing agent injected by the reducing agent supply apparatus through the reducing agent supply port may spread in a fan-like or conical shape. If this is the case, the reducing agent supply apparatus and the catalyst apparatus may be disposed in such a way that when the reducing agent is injected through the reducing agent supply port of the reducing agent supply apparatus, the upstream end face of the first catalyst is located in a spray of the reducing agent that is formed in the fan-like or conical shape.

With this configuration, a larger part of the reducing agent injected through the reducing agent supply apparatus can be supplied to the first catalyst.

In this invention, the reducing agent supply apparatus may be provided in a portion of the exhaust passage in which the flow rate of the exhaust gas is unevenly distributed with respect to a direction perpendicular to the axial direction. If this is the case, the route in the exhaust passage downstream of the reducing agent supply apparatus in which a larger quantity of exhaust gas flows will be the route of the flow of the reducing agent supplied through the reducing agent supply apparatus.

Therefore, in the above-described configuration, the first catalyst is disposed at a position with respect to the direction perpendicular to an axial direction of the exhaust passage at which the flow rate of the exhaust gas is high and that is located within a flow path of the reducing agent supplied through the reducing agent supply apparatus. With this configuration also, the reducing agent supplied through the reducing agent supply apparatus can be prevented from being excessively diffused before reaching the first catalyst.

BRIEF DESCRIPTION OF THE DRAWINGS

FIG. 3 schematically shows configurations of the catalyst apparatus according to embodiment 1. Diagram (a) in FIG. 3 shows a case in which a guide is provided on the upstream end face of the second catalyst. Diagram (b) in FIG. 3 shows a case in which a guide is provided on the inner circumferential surface of the exhaust passage between the first catalyst and the second catalyst. Diagram (c) in FIG. 3 shows a case in which a guide is provided on the downstream end face of the first catalyst.

THE BEST MODE FOR CARRYING OUT THE INVENTION

In the following, specific embodiments of the catalyst apparatus and the exhaust gas purification system for an internal combustion engine according to the present invention will be described with reference to the drawings.

Embodiment 1

Figure 1:
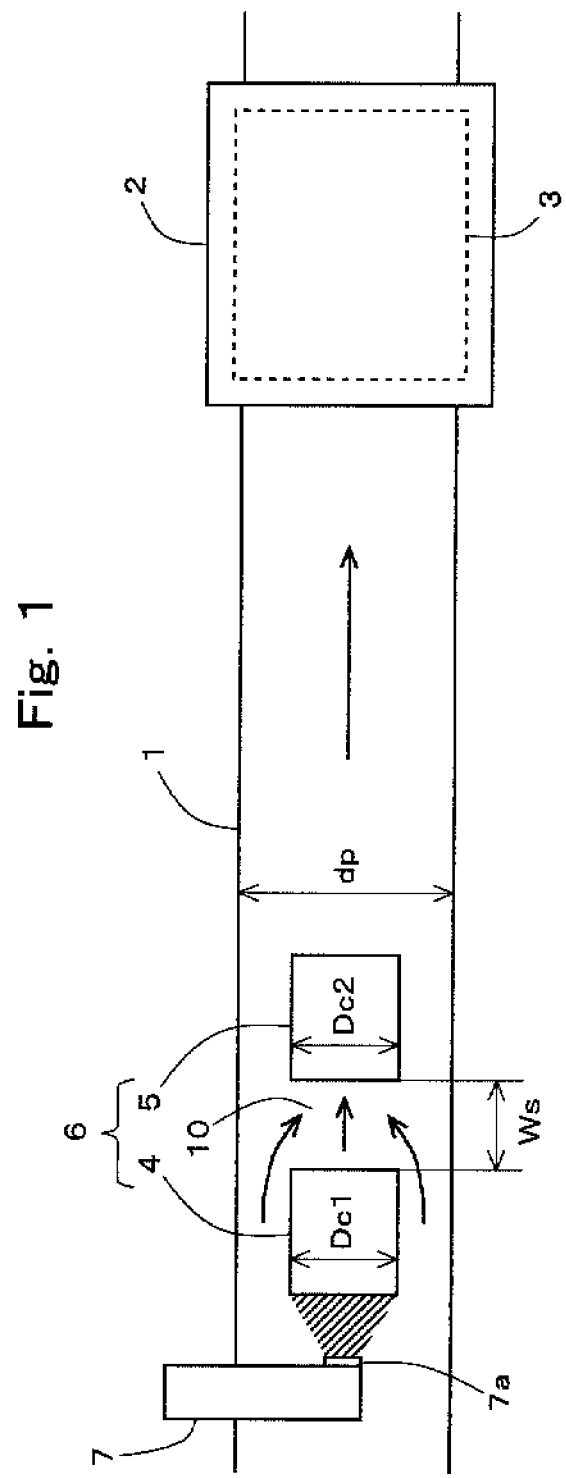
FIG. 1 is a diagram showing the general configuration of an exhaust gas purification system for an internal combustion engine according to embodiment 1.

Here, a case in which the present invention is applied to a diesel engine for driving a vehicle will be described by way of example. FIG. 1 is a diagram showing the general configuration of an exhaust gas purification system for an internal combustion engine according to this embodiment. In FIG. 1, the arrows indicate directions of flow of the exhaust gas.

The upstream end of an exhaust passage 1 is connected to the internal combustion engine. The exhaust passage 1 is provided with a filter 2. An NOx catalyst 3 is supported on the filter 2. In this embodiment, the filter 2 corresponds to the exhaust gas purification apparatus according to the present invention. Only either one of an NOx catalyst or a filter may be provided in the exhaust passage 1 instead of the filter 2 on which the NOx catalyst 3 is supported. Alternatively, the NOx catalyst and the filter may be arranged in series along the direction of flow of the exhaust gas. Alternatively, a catalyst other than the NOx catalyst may be provided.

A catalyst apparatus 6 made up of first and second catalysts 4, 5 is provided in the exhaust passage 1 upstream of the filter 2. The first and the second catalysts 4, 5 are wall-flow oxidation catalysts of a cylindrical shape having a plurality of cells extending along the axial direction.

The outer diameter Dc1 of the first catalyst 4 and the outer diameter Dc2 of the second catalyst 5 are the same and smaller than the inner diameter dp of the exhaust passage 1. In other words, the cross sectional area of the first catalyst 4 and the cross sectional area of the second catalyst 5 are the same and smaller than the cross sectional area of the exhaust passage 1. With the above-described configuration of the first and the second catalysts 4, 5, the exhaust gas flows through the gap between the outer circumferential surfaces of the first and the second catalysts 4, 5 and the inner circumferential surface of the exhaust passage 1. The cross sectional area of each cell in the first catalyst 4 and the cross sectional area of each cell in the second catalyst 5 are the same.

The second catalyst 5 is disposed downstream of the first catalyst 4 with a space 10 having a specific width Ws therebetween. The specific width Ws is such a width that allows at least a portion of the exhaust gas having passed through the gap between the outer circumferential surface of the first catalyst 4 and the inner circumferential surface of the exhaust passage 1 to flow onto the front end of the second catalyst 5, and causes the heat generated by the oxidation of fuel in the first catalyst 4 as fuel is added through a fuel addition valve 7 that will be described later and the fuel reformed in and discharged from the first catalyst 4 to reach the second catalyst 5 without being excessively diffused. The specific width Ws is smaller than the distance between the second catalyst 5 and the filter 2.

The outer diameters Dc1, Dc2 of the first and the second catalysts 4, 5 and the specific width Ws can be determined in advance by, for example, experiments. For example, the outer diameters Dc1, Dc2 of the first and the second catalysts 4, 5 may be designed to have values of 50 to 60 percent of the inner diameter dp of the exhaust passage 1, and the specific width Ws may be designed to have a value that is roughly equal to or larger than the outer diameters Dc1, Dc2 of the first and the second catalysts 4, 5 and roughly equal to or smaller than the inner diameter dp of the exhaust passage 1.

The first and the second catalysts 4, 5 are not limited to oxidation catalysts, but they may be any catalysts that have an oxidizing ability. The axes of the first and the second catalysts 4, 5 and the axis of the exhaust passage 1 are not necessarily required to be parallel to each other, but each catalyst 4, 5 may be arranged in such a way that the axis of each catalyst 4, 5 intersects the axis of the exhaust passage 1 as long as the exhaust gas can flow through the gap between the outer circumferential surfaces of the catalysts 4, 5 and the inner circumferential surface of the exhaust passage 1. The shapes of the first and the second catalysts 4, 5 are not limited to cylindrical shapes. The catalyst apparatus 6 may be made up of three or more catalysts.

The fuel addition valve 7 that adds fuel serving as reducing agent is provided in the exhaust passage 1 upstream of the catalyst apparatus 6. The fuel addition valve 7 is disposed in the vicinity of the first catalyst 4 in such a way that its fuel injection port 7a through which fuel is injected is opposed to the upstream end face of the first catalyst 4. Fuel is injected in such a way as to spread conically from the fuel injection port 7a of the fuel addition valve 7 (the sprayed fuel being represented by the hatched portion in FIG. 1). The upstream end face of the first catalyst 4 is designed to be located in the conically formed spray of fuel as fuel is injected from the fuel injection port 7a.

In this embodiment, the fuel addition valve 7 corresponds to the reducing agent supply apparatus according to the present invention, and the fuel injection port 7a corresponds to the reducing agent supply port according to the present invention.

In this embodiment, when the temperature of the filter 2 is to be raised, that is, for example, when the particulate matter trapped in the filter 2 is to be removed by oxidizing it, or when SOx stored in the NOx catalyst 3 is to be released and reduced, an exhaust gas temperature raising control for raising the temperature of the exhaust gas flowing into the filter 2 is performed.

The exhaust gas temperature raising control according to this embodiment is implemented by injecting fuel through the fuel addition valve 7 to supply fuel to the catalyst apparatus 6. The fuel supplied to the catalyst apparatus 6 is oxidized in the first and the second catalysts 4, 5. The temperature of the exhaust gas flowing into the filter 2 is raised by the heat of oxidation generated thereby. Therefore, in this embodiment, the first and the second catalysts 4, 5 that constitute the catalyst apparatus 6 serve as catalysts for raising the temperature of the exhaust gas.

In this embodiment, as described above, the outer diameters Dc1, Dc2 of the first catalyst 4 and the second catalyst 5 are smaller than the inner diameter dp of the exhaust passage 1. In this case, the cross sectional area of the cells of each catalyst 4, 5 is smaller than that in the case where the outer diameters Dc1, Dc2 of the first and the second catalysts 4, 5 are equal to or larger than the inner diameter dp of the exhaust passage 1. Then, the resistance against the exhaust gas flow passing through each catalyst 4, 5 becomes larger, and consequently the flow rate of the exhaust gas flowing in each catalyst 4, 5 becomes smaller. Therefore, when fuel is supplied through the fuel addition valve 7, the time taken for the fuel to pass through each catalyst 4, 5 becomes longer, which further facilitates the fuel reforming reaction and oxidation reaction in each catalyst 4, 5. Thus, the temperature rise of the exhaust gas will be promoted.

In this embodiment, the catalyst for raising the temperature of the exhaust gas is divided into two catalysts, namely the first catalyst 4 and the second catalyst 5. This allows the axial length of the first catalyst 4 to be made relatively short. Therefore, shortage of the supply of oxygen used for oxidation of fuel on the downstream side of the first catalyst 4 is prevented from being caused by the lowness in the flow rate of the exhaust gas in the first catalyst 4.

Furthermore, in this embodiment, the second catalyst 5 is disposed downstream of the first catalyst 4 with a space 10 having a specific width therebetween. Consequently, the exhaust gas having flowed through the gap between the outer circumferential surface of the first catalyst 4 and the inner circumferential surface of the exhaust passage 1 flows into the second catalyst 5, whereby oxygen is supplied to the second catalyst 5. Thus, shortage of the supply of oxygen used to oxidize fuel to the second catalyst 5 can also be prevented from occurring. In addition, the heat generated by the oxidation of fuel in the first catalyst 4 and the fuel that has been reformed in the first catalyst 4 are supplied to the second catalyst 5. Therefore, reformed fuel and oxygen are supplied to the second catalyst 5 having enhanced activity. Consequently, the oxidation of fuel in the second catalyst 5 can further be promoted.

As described above, according to this embodiment, the oxidation of fuel in the catalyst apparatus 6 can be promoted more effectively. Therefore, the temperature of the exhaust gas can be raised with higher efficiency. Consequently, the temperature of the filter 2 can be raised more rapidly with a smaller quantity of fuel.

In this embodiment, the exhaust gas flows also through the gap between the outer circumferential surface of the second catalyst 5 and the inner circumferential surface of the exhaust passage 1. Consequently, the heat that is generated by the oxidation of fuel in the second catalyst 5 is carried to the filter 2 by the exhaust gas flowing through the gap between the outer circumferential surface of the second catalyst 5 and the inner circumferential surface of the exhaust passage 1. This also can further promote the temperature rise of the filter 2.

In this embodiment, the fuel addition valve 7 and the catalyst apparatus 6 are disposed close to each other in such a way that the fuel injection port 7a of the fuel addition valve 7 and the upstream end face of the first catalyst 4 are opposed to each other. In addition, they are arranged in such a way that as fuel injected from the fuel injection port 7a, the upstream end face of the first catalyst 4 is located in the spray of fuel that is formed in a conical shape.

With the above arrangement, fuel injected through the fuel addition valve 7 can be prevented from being excessively diffused before reaching the first catalyst 4, and a larger part of the fuel injected through the fuel addition valve 7 can be supplied to the first catalyst 4. Consequently, the temperature of the exhaust gas can be raised with a smaller quantity of fuel. In addition, it is possible to prevent the fuel injected through the fuel addition valve 7 from flowing downstream past the catalyst apparatus 6 without being oxidized in the catalyst apparatus 6.

In this embodiment, when the exhaust gas temperature raising control is executed, since the heat generated by the oxidation of fuel in the first catalyst 4 and the fuel that has been reformed in the first catalyst 4 are supplied to the second catalyst 5, the temperature of the second catalyst 5 tends to become higher than the temperature of the first catalyst 4. In view of this, the second catalyst 5 may be a catalyst that has higher heat resistance than the first catalyst 4. (For example, the second catalyst 5 may be a catalyst using palladium (Pd).) If this is the case, the durability of the catalyst apparatus 6 can be improved.

On the other hand, the first catalyst 4 may be a catalyst having higher low temperature activity than the second catalyst 5. (For example, the first catalyst 4 may be a catalyst using platinum (Pt)). If this is the case, the reformation and oxidation of fuel in the first catalyst can further be promoted.

The more the reformation of fuel in the first catalyst 4 is promoted, the more the oxidation of fuel in the second catalyst 5 is promoted. Therefore, the first catalyst 4 may be a catalyst that has higher reforming ability than the second catalyst 5. (For example, the first catalyst may be a catalyst using rhodium (Rh).) If this is the case, quicker temperature rise of the exhaust gas can be achieved.

As described above, by using suitable noble metals having different characteristics in the first catalyst 4 and the second catalyst 5, the performance of the catalyst apparatus 6 can be improved with a lower cost.

The first catalyst 4 may be a catalyst equipped with a heating device such as an electric heater or a glow plug. If this is the case, the oxidation of fuel in the catalyst apparatus 6 can be promoted even at the time when the temperature of the exhaust gas is low. Furthermore, since the size of the first catalyst 4 can be made smaller, the amount of noble metal used in the first catalyst 4 can be made smaller.

Figure 2:
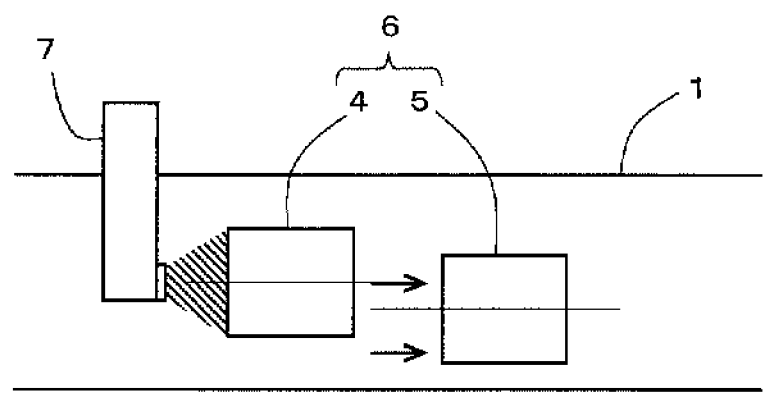
FIG. 2 is a diagram showing the general configuration of a catalyst apparatus according to embodiment 1.

In this embodiment, as shown in FIG. 2, the first catalyst 4 and the second catalyst 5 of the catalyst apparatus 6 may be arranged in such a way that the axes thereof are offset from each other with respect to the radial direction of the exhaust passage 1. If this is the case, the exhaust gas is more prone to flow into the second catalyst 5, and therefore oxygen for oxidizing fuel is more prone to be supplied to the second catalyst 5. The arrows in FIG. 2 also indicate directions of flow of the exhaust gas.

In this embodiment, there may be provided a guide 8 for guiding the exhaust gas having passed through the gap between the outer circumferential surface of the first catalyst 4 and the inner circumferential surface of the exhaust passage 1 to the upstream end face of the second catalyst 5, as shown in FIG. 3. Diagram (a) in FIG. 3 shows a case in which the guide 8 is provided on the upstream end face of the second catalyst 5. Diagram (b) in FIG. 3 shows a case in which the guide 8 is provided on the inner circumferential surface of the exhaust passage 1 between the first catalyst 4 and the second catalyst 5. Diagram (c) in FIG. 3 shows a case in which the guide 8 is provided on the downstream end face of the first catalyst 4. The arrows in FIG. 3 also indicate directions of flow of the exhaust gas.

By providing the guide 8 as above, a larger quantity of exhaust gas is caused to flow into the second catalyst 5, and consequently a larger quantity of oxygen for oxidizing fuel can be supplied to the second catalyst 5. Furthermore, since the fuel contained in the exhaust gas flowing in the gap between the outer circumferential surface of the first catalyst 4 and the inner circumferential surface of the exhaust passage 1 is prone to flow into the second catalyst 5, it is possible to prevent more effectively the fuel injected through the fuel addition valve 7 from flowing downstream past the catalyst apparatus 6 without being oxidized in the first catalyst 4 or the second catalyst 5.

Figure 4:
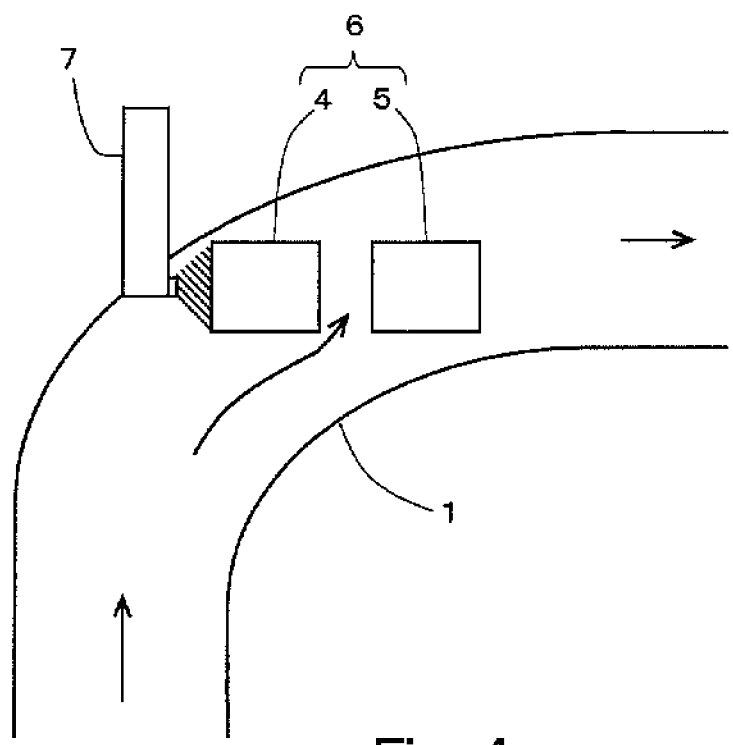
FIG. 4 is a diagram showing a case in which the catalyst apparatus and a fuel addition valve are provided in a curved portion of the exhaust passage in embodiment 1.

In this embodiment, the catalyst apparatus 6 and the fuel addition valve 7 may be disposed in a curved portion of the exhaust passage 1. In this case, the first catalyst 4 and the second catalyst 5 may be arranged in such a way that the axes of the first catalyst 4 and the second catalyst 5 are transverse to the tangential line of the curve of the exhaust passage 1, as shown in FIG. 4. If this is the case, the exhaust gas is prone to flow into the space 10 between the first catalyst 4 and the second catalyst 5. Therefore, the exhaust gas is prone to flow onto the upstream end face of the second catalyst 5. This facilitates the supply of oxygen for oxidizing fuel to the second catalyst 5. The arrows in FIG. 4 also indicate directions of flow of the exhaust gas.

Modification

Figure 5:
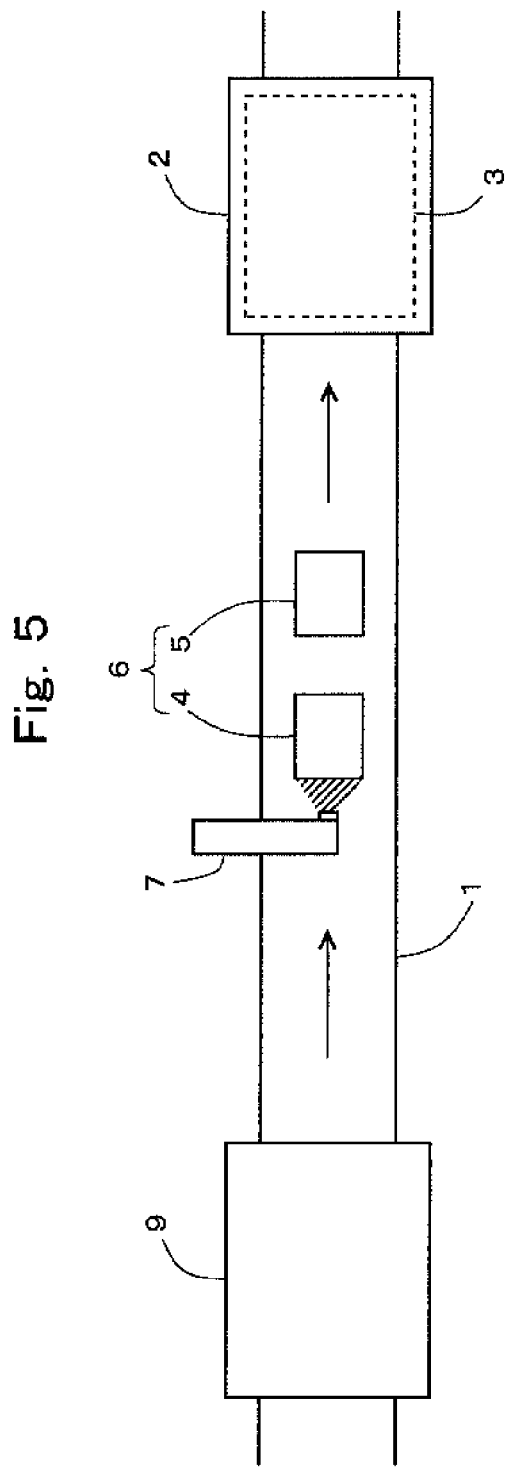
FIG. 5 is a diagram showing the general configuration of an exhaust gas purification system for an internal combustion engine according to a modification of embodiment 1.

FIG. 5 is a diagram showing a modification of the embodiment. In this modification, an NOx catalyst is provided in the exhaust passage 1 upstream of the filter 2. The NOx catalyst 9 may be any catalyst that has the ability of purifying the exhaust gas. The arrows in FIG. 5 also indicate directions of flow of the exhaust gas.

In cases where the filter 2 and the NOx catalyst 9 are provided in the exhaust passage 1, as with this modification, the temperature of the filter 2 is harder to be raised by the exhaust gas than the temperature of the NOx catalyst 9 is, because the filter 2 is more distant from the internal combustion engine than the NOx catalyst 9 is. For this reason, in this modification, the catalyst apparatus 6 and the fuel addition valve 7 are provided in the exhaust passage 1 downstream of the NOx catalyst 9 and upstream of the filter 2. With this arrangement, the temperature of the filter 2 can be raised more efficiently even if the filter 2 is disposed at a position more distant from the internal combustion engine in the exhaust passage 1.

Embodiment 2

Figure 6:
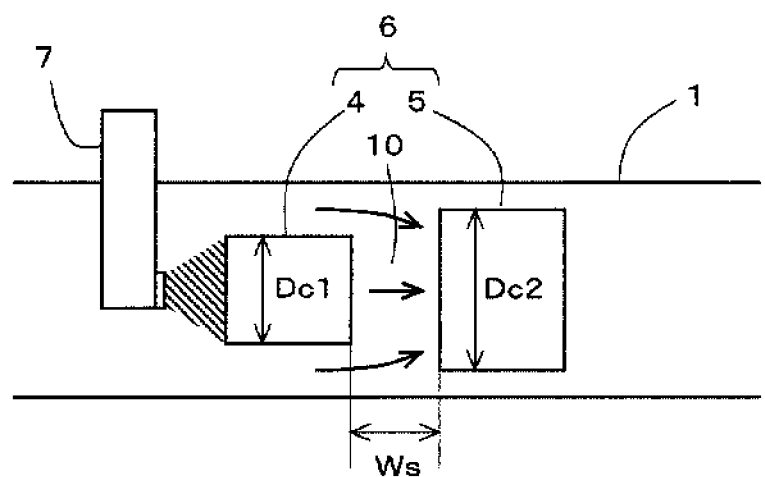
FIG. 6 is a diagram showing the general configuration of a catalyst apparatus according to embodiment 2.

FIG. 6 is a diagram showing the general configuration of a catalyst apparatus 6 according to this embodiment. In this embodiment, as shown in FIG. 6, the outer diameter Dc2 of the second catalyst 5 is larger than the outer diameter Dc1 of the first catalyst 4. In other words, the cross sectional area of the second catalyst 5 is larger than the cross sectional area of the first catalyst 4. The construction other than this is the same as embodiment 1. The arrows in FIG. 6 also indicate directions of flow of the exhaust gas.

With the configuration according to this embodiment, the exhaust gas having passed through the gap between the outer circumferential surface of the first catalyst 4 and the inner circumferential surface of the exhaust passage 1 is prone to flow into the second catalyst 5. Consequently, when the exhaust gas temperature raising control is performed, a larger quantity of oxygen for oxidizing fuel can be supplied to the second catalyst 5. Furthermore, when the exhaust gas temperature raising control is performed, the fuel contained in the exhaust gas flowing in the gap between the outer circumferential surface of the first catalyst 4 and the inner circumferential surface of the exhaust passage 1 is prone to flow into the second catalyst 5. Therefore, it is possible to prevent more effectively the fuel injected through the fuel addition valve 7 from flowing downstream past the catalyst apparatus 6 without being oxidized in the first catalyst 4 or the second catalyst 5.

As described above, when the exhaust gas temperature raising control is performed, the temperature of the second catalyst will become higher than the temperature of the first catalyst 4. In addition, the higher the temperature of the catalyst is, the larger the resistance against the exhaust gas flow in the catalyst is. Therefore, if the outer diameter of the first catalyst 4 and the outer diameter of the second catalyst 5 are the same, the resistance against the exhaust gas flow in the second catalyst 5 may become higher than the resistance against the exhaust gas flow in the first catalyst 4, at the time when the temperatures of the first and the second catalysts 4, 5 rise due to the exhaust gas temperature raising control.

By making the outer diameter Dc2 of the second catalyst 5 larger than the outer diameter Dc1 of the first catalyst 4 as is the case with this embodiment, the resistance against the exhaust gas flow in the second catalyst 5 can be prevented from increasing excessively when the exhaust gas temperature raising control is performed. Thus, oxygen can be prevented from becoming difficult to be supplied to the downstream portion of the second catalyst 5. Therefore, the oxidation of fuel in the second catalyst 5 can be promoted more effectively.

Modification

Figure 7:
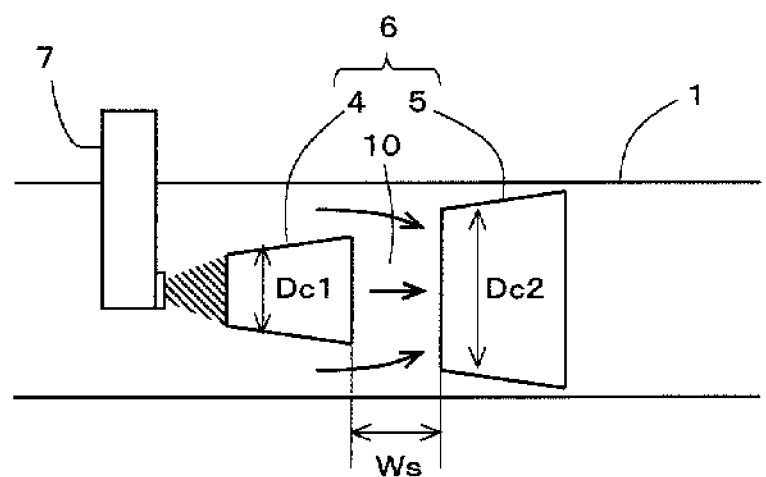
FIG. 7 is a diagram showing the general configuration of a catalyst apparatus according to a modification of embodiment 2.

FIG. 7 is a diagram showing the general configuration of a catalyst apparatus 6 according to a modification of the embodiment. In this embodiment, the respective outer diameters Dc1, Dc2 of the first and the second catalysts 4, 5 may increase gradually from upstream to downstream as shown in FIG. 7. Even when this is the case, the cross sectional area of the upstream end portion of the second catalyst 5 is designed to be larger than the downstream end portion of the first catalyst 4.

When the exhaust gas temperature raising control is performed and fuel is supplied to the catalysts 4, 5 from upstream thereof, the heat generated by the oxidation of fuel in the upstream portions of the respective catalysts 4, 5 is transferred to the downstream portions of the respective catalysts 4, 5, and fuel reformed in the upstream portions of the respective catalysts 4, 5 is supplied to the downstream portions of the respective catalysts 4, 5. Therefore, the temperatures of the respective catalysts 4, 5 increase toward the downstream side. Consequently, if the outer diameters Dc1, Dc2 of the respective catalysts 4, 5 are constant along the axis, the resistance against the exhaust gas flow in the downstream portions of the catalysts 4, 5 may become higher than the resistance against the exhaust gas flow in the upstream portions at the time when the exhaust gas temperature raising control is performed.

In view of this, the outer diameters Dc1, Dc2 of the respective catalysts 4, 5 are designed to increase gradually from upstream to downstream, whereby the resistance against the exhaust gas flow can be prevented from increasing excessively in the downstream portions of the respective catalysts 4, 5 at the time when the temperatures of the catalysts 4, 5 rise by the execution of the exhaust gas temperature raising control. As a result, oxygen can be prevented from becoming difficult to be supplied to the downstream portions of the respective catalysts 4, 5. Therefore, the oxidation of fuel in the catalysts 4, 5 can be promoted more effectively.

Embodiment 3

Figure 8:
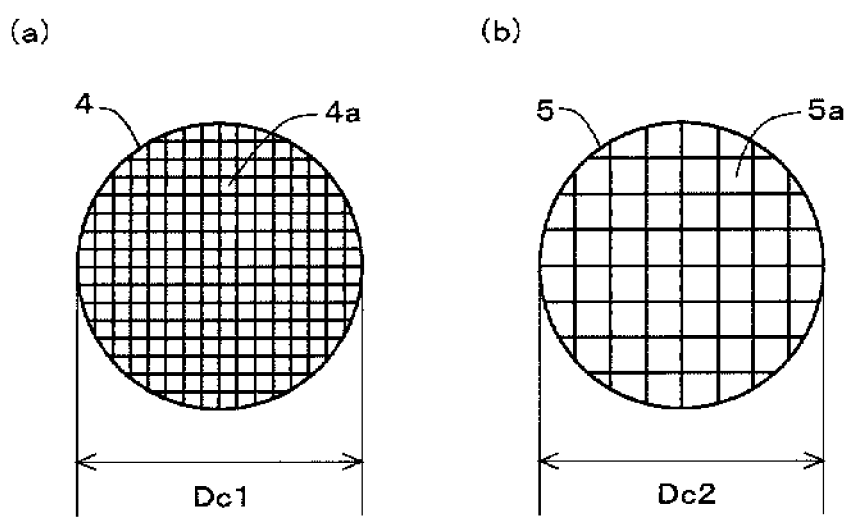
FIG. 8 shows cross sections of the first and the second catalysts according to embodiment 3 in the direction perpendicular to the axial direction. Diagram (a) in FIG. 8 shows the cross section of the first catalyst in the direction perpendicular to the axial direction. Diagram (b) in FIG. 8 shows the cross section of the second catalyst in the direction perpendicular to the axial direction.

FIG. 8 shows cross sections of the first and the second catalysts 4, 5 according to this embodiment taken in the direction perpendicular to the axial direction. Diagram (a) in FIG. 8 shows the cross section of the first catalyst 4 taken in the direction perpendicular to the axial direction, and diagram (b) in FIG. 8 shows the cross section of the second catalyst 5 taken in the direction perpendicular to the axial direction. In this embodiment, as shown in FIG. 8, the outer diameter Dc1 of the first catalyst 4 and the outer diameter Dc2 of the second catalyst 5 are the same, and the cross sectional area of each cell 5a in the second catalyst 5 is larger than the cross sectional area of each cell 4a in the first catalyst 4. The construction other than this is the same as embodiment 1.

With the construction of this embodiment, the resistance against the exhaust gas flow in the second catalyst 5 can be prevented from increasing excessively at the time when the temperatures of the first and the second catalysts 4, 5 rise with the execution of the exhaust gas temperature raising control, just as in the case where the outer diameter Dc2 of the second catalyst 5 is larger than the outer diameter Dc1 of the first catalyst 4 like in embodiment 2. Thus, oxygen can be prevented from becoming difficult to be supplied to the downstream portion of the second catalyst 5. Therefore, the oxidation of fuel in the second catalyst 5 can be promoted more effectively.

Embodiment 4

Figure 9:
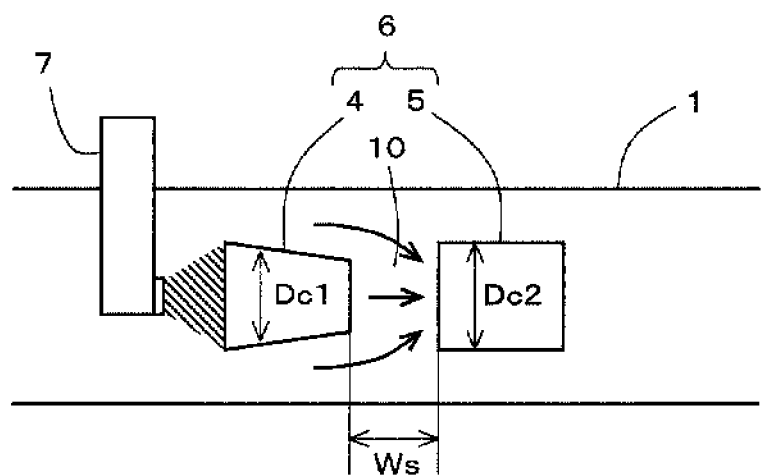
FIG. 9 is a diagram showing the general configuration of a catalyst apparatus according to embodiment 4.

FIG. 9 is a diagram showing the general configuration of a catalyst apparatus 6 according to this embodiment. In this embodiment, as shown in FIG. 9, the outer diameter Dc1 of the first catalyst 4 gradually decreases from upstream to downstream. The arrows in FIG. 9 also indicate directions of flow of the exhaust gas.

With the configuration in this embodiment, the fuel discharged from the first catalyst 4 without being oxidized is prone to flow into the second catalyst 5. Therefore, it is possible to prevent the fuel from flowing downstream past the catalyst apparatus 6 without being oxidized in the first catalyst 4 or the second catalyst 5. Furthermore, the exhaust gas having passed through the gap between the outer circumferential surface of the first catalyst 4 and the inner circumferential surface of the exhaust passage 1 is prone to flow into the second catalyst 5. Consequently, oxygen is prone to be supplied to the second catalyst 5. Therefore, the oxidation of fuel in the second catalyst 5 can be promoted more effectively.

Embodiment 5

Figure 10:
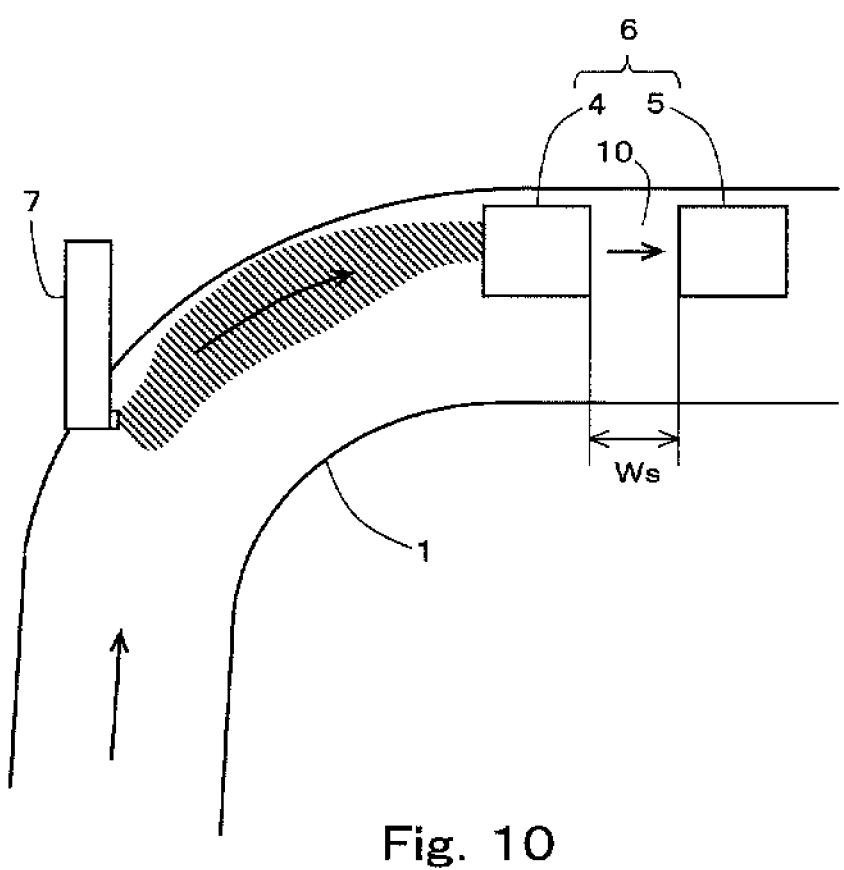
FIG. 10 is a diagram showing the general configuration of a portion of an exhaust gas purification system for an internal combustion engine according to embodiment 1.

FIG. 10 is a diagram showing the general configuration of an exhaust gas purification system for an internal combustion engine according to this embodiment. In this embodiment also, a filter 2 like that in embodiment 1 is provided in the exhaust passage 1 downstream of the catalyst apparatus 6 though not shown in FIG. 10. In this embodiment also, the construction of the catalyst apparatus 6 and the construction of the fuel addition valve 7 are the same as those in embodiment 1. Therefore, only the features different from embodiment 1 will be described herein. In FIG. 10 also, the arrows indicate directions of flow of the exhaust gas, and the hatched portion represents the spray of fuel added through the fuel addition valve 7.

In this embodiment, as shown in FIG. 10, the fuel addition valve 7 is disposed in a curved portion of the exhaust passage 1. The first and the second catalyst 4, 5 of the catalyst apparatus 6 are disposed near the outer side of the curve in the exhaust passage 1 immediately downstream of the curved portion.

In the curved portion of the exhaust passage 1, the flow rate of the exhaust gas is distributed unevenly with respect to the diametrical direction of the exhaust passage 1. Specifically, the flow rate of the exhaust gas is higher in the outer portion of the curve than in the inner portion of the curve. When the flow rate of the exhaust gas is unevenly distributed as described above, the route in the exhaust passage 1 downstream of the fuel addition valve 7 in which a larger quantity of exhaust gas flows will be the route of the flow of the fuel injected through the fuel addition valve 7. Thus, a larger part of the fuel injected through the fuel addition valve 7 will flow in the outer portion in the curved portion, as shown in FIG. 10.

Therefore, the fuel addition valve 7 and the first and the second catalysts 4, 5 are disposed at the positions shown in FIG. 10, whereby the first and the second catalysts 4, 5 are located at positions, with respect to the diametrical direction of the exhaust passage 1, at which the flow rate of the exhaust gas is high and that are located within the flow path of the fuel injected through the fuel addition valve 7 when the exhaust gas temperature raising control is performed. Thus, the fuel injected through the fuel addition valve 7 is prevented from being excessively diffused before reaching the first catalyst 4, as with the case where the fuel addition valve 7 and the first and the second catalysts 4, 5 are disposed at the positions shown in FIG. 1. Thus, the temperature of the exhaust gas can be raised with a smaller quantity of fuel. In addition, it is possible to prevent the fuel injected through the fuel addition valve 7 from flowing downstream past the catalyst apparatus 6 without being oxidized in the catalyst apparatus 6.

In this embodiment, the curved portion of the exhaust passage 1 corresponds to the portion of the exhaust passage in which the flow rate of the exhaust gas is unevenly distributed with respect to a direction perpendicular to the axial direction according to the present invention.

The embodiments described in the foregoing may be implemented in combination, where feasible.

INDUSTRIAL APPLICABILITY

According to the present invention, in cases where a catalyst apparatus including a catalyst having an oxidizing ability is provided in an exhaust passage of an internal combustion engine, the temperature of the exhaust gas can be raised with improved efficiency.

The invention claimed is:

1. A catalyst apparatus for an internal combustion engine that is provided in an exhaust passage of the internal combustion engine and to which reducing agent is supplied from upstream when the temperature of exhaust gas is to be raised, comprising:
    a first catalyst having an oxidizing ability that is configured in such a way that the exhaust gas flows through a gap between its outer circumferential surface and an inner circumferential surface of said exhaust passage; and
    a second catalyst having an oxidizing ability that is disposed downstream of the first catalyst with a space having a specific width between it and the first catalyst and configured in such a way that the exhaust gas flows through a gap between its outer circumferential surface and the inner circumferential surface of said exhaust passage,
    wherein a cross sectional area of said second catalyst in the direction perpendicular to an axial direction is larger than a cross sectional area of said first catalyst in a direction perpendicular to the axial direction.

2. A catalyst apparatus for an internal combustion engine according to claim 1, wherein the respective cross sectional areas of said first and second catalysts in the direction perpendicular to the axial direction gradually increase from upstream to downstream.

3. A catalyst apparatus for an internal combustion engine according to claim 1, wherein a cross sectional area of each cell in said second catalyst in the direction perpendicular to the axial direction is larger than a cross sectional area of each cell in said first catalyst in the direction perpendicular to the axial direction.

4. A catalyst apparatus for an internal combustion engine according to claim 1, wherein the cross sectional area of said first catalyst in the direction perpendicular to the axial direction gradually decreases from upstream to downstream.

5. An exhaust gas purification system for an internal combustion engine comprising:
    an exhaust gas purification apparatus provided in an exhaust passage of the internal combustion engine;
    a catalyst apparatus provided in said exhaust passage upstream of said exhaust gas purification apparatus; and
    a reducing agent supply apparatus that supplies reducing agent to said catalyst apparatus from the upstream side of the catalyst apparatus,
    wherein when the temperature of said exhaust gas purification apparatus is to be raised, the temperature of exhaust gas is raised by supplying reducing agent from said reducing agent supply apparatus to said catalyst apparatus,
    wherein said catalyst apparatus comprises at least first and second catalysts having an oxidizing ability, said first catalyst is configured in such a way that the exhaust gas flows through a gap between its outer circumferential surface and an inner circumferential surface of said exhaust passage, and said second catalyst is disposed downstream of said first catalyst with a space having a specific width between it and said first catalyst,
    wherein a cross sectional area of said second catalyst in the direction perpendicular to an axial direction is larger than a cross sectional area of said first catalyst in a direction perpendicular to the axial direction.

6. An exhaust gas purification system for an internal combustion engine according to claim 5, wherein the cross sectional area of said first catalyst in the direction perpendicular to the axial direction is smaller than a cross sectional area of said exhaust passage in the direction perpendicular to the axial direction.

7. An exhaust gas purification system for an internal combustion engine according to claim 6, wherein the respective cross sectional areas of said first and second catalysts in the direction perpendicular to the axial direction gradually increase from upstream to downstream.

8. An exhaust gas purification system for an internal combustion engine according to claim 6, wherein a cross sectional area of each cell in said second catalyst in the direction perpendicular to the axial direction is larger than a cross sectional area of each cell in said first catalyst in the direction perpendicular to the axial direction.

9. An exhaust gas purification system for an internal combustion engine according to claim 6, wherein the cross sectional area of said first catalyst in the direction perpendicular to the axial direction gradually decreases from upstream to downstream.

10. An exhaust gas purification system for an internal combustion engine according to claim 5, wherein said reducing agent supply apparatus and said catalyst apparatus are disposed close to each other in said exhaust passage in such a way that a reducing agent supply port of said reducing agent supply apparatus and an upstream end face of said first catalyst are opposed to each other.

11. An exhaust gas purification system for an internal combustion engine according to claim 10, wherein the reducing agent injected by said reducing agent supply apparatus through the reducing agent supply port spreads in a fan-like or conical shape, and said reducing agent supply apparatus and said catalyst apparatus are disposed in such a way that when the reducing agent is injected through the reducing agent supply port of said reducing agent supply apparatus, the upstream end face of said first catalyst is located in a spray of the reducing agent that is formed in the fan-like or conical shape.

12. An exhaust gas purification system for an internal combustion engine according to claim 5, wherein said reducing agent supply apparatus is provided in a portion of said exhaust passage in which the flow rate of the exhaust gas is unevenly distributed with respect to a direction perpendicular to the axial direction, and said first catalyst is disposed at a position with respect to a direction perpendicular to a axial direction of said exhaust passage at which the flow rate of the exhaust gas is high and that is located within a flow path of the reducing agent supplied through said reducing agent supply apparatus.

13. An exhaust gas purification system for an internal combustion engine according to claim 5, wherein said specific width is smaller than the distance between said catalyst apparatus and said exhaust gas purification apparatus.

* * * * *